(12) United States Patent
Mann et al.

(10) Patent No.: US 12,551,093 B2
(45) Date of Patent: Feb. 17, 2026

(54) INGESTIBLE DEVICE WITH PROPULSION

(71) Applicant: Given Imaging LTD., Yoqneam (IL)

(72) Inventors: Chen Mann, Kibbutz Merchavia (IL); Vitaly Fastovsky, Haifa (IL); Yaniv Birnboim, Shaarey Tiqwa (IL); Eyal David, Atlit (IL); Daniel Weihs, Haifa (IL); Mark Ishay, Haifa (IL)

(73) Assignee: GIVEN IMAGING LTD., Yoqneam (IL)

( * ) Notice: Subject to any disclaimer, the term of this patent is extended or adjusted under 35 U.S.C. 154(b) by 305 days.

(21) Appl. No.: 18/346,899

(22) Filed: Jul. 5, 2023

(65) Prior Publication Data
US 2024/0008726 A1 Jan. 11, 2024

Related U.S. Application Data

(60) Provisional application No. 63/359,263, filed on Jul. 8, 2022.

(51) Int. Cl.
*A61B 1/00* (2006.01)
*A61B 1/04* (2006.01)

(52) U.S. Cl.
CPC .......... *A61B 1/041* (2013.01); *A61B 1/00156* (2013.01)

(58) Field of Classification Search
CPC .................. A61B 1/041; A61B 1/00156
See application file for complete search history.

(56) References Cited

U.S. PATENT DOCUMENTS

| | | |
|---|---|---|
| 1,748,345 A | 2/1930 | Hellmann |
| 2,761,710 A | 9/1956 | Rudner |
| 3,591,109 A | 7/1971 | McLarty |
| 3,709,187 A | 1/1973 | Marco et al. |
| 3,790,105 A | 2/1974 | Eickman |
| 4,936,835 A | 6/1990 | Haaga |
| 5,810,289 A | 9/1998 | Sager |
| 5,993,378 A | 11/1999 | Lemelson |
| 6,110,128 A | 8/2000 | Andelin et al. |
| 6,240,312 B1 | 5/2001 | Alfano et al. |
| 6,939,290 B2 | 9/2005 | Iddan |
| 6,958,034 B2 | 10/2005 | Iddan |
| 7,643,865 B2 | 1/2010 | Iddan et al. |
| 7,647,090 B1 | 1/2010 | Frisch et al. |
| 7,807,251 B1 | 10/2010 | Wallach |
| 7,857,767 B2 | 12/2010 | Ferren et al. |
| 7,998,060 B2 | 8/2011 | Ferren et al. |
| 8,019,413 B2 | 9/2011 | Ferren et al. |
| 8,038,600 B2 | 10/2011 | Uchiyama et al. |
| 8,414,559 B2 | 4/2013 | Gross |
| 8,439,851 B2 | 5/2013 | Chiba et al. |
| 8,517,927 B2 | 8/2013 | Asada et al. |

(Continued)

FOREIGN PATENT DOCUMENTS

| | | |
|---|---|---|
| JP | 6473266 B1 | 2/2019 |
| WO | 2020100321 A1 | 5/2020 |

*Primary Examiner* — Timothy J Neal
(74) *Attorney, Agent, or Firm* — Carter, DeLuca & Farrell, LLP

(57) ABSTRACT

An ingestible device includes a cylindrical capsule having a central axis defined therethrough, a proximal end portion, and an atraumatically shaped distal end portion. A propulsion unit is disposed at the proximal end portion of the capsule for effecting movement of the capsule within an in vivo environment.

17 Claims, 9 Drawing Sheets

(56) References Cited

U.S. PATENT DOCUMENTS

| | | |
|---|---|---|
| 8,529,436 B2 | 9/2013 | Jung et al. |
| 9,795,330 B2 | 10/2017 | Pascal et al. |
| 11,045,080 B2 | 6/2021 | Moyer et al. |
| 2002/0120178 A1 | 8/2002 | Tartaglia et al. |
| 2002/0198439 A1 | 12/2002 | Mizuno |
| 2003/0019572 A1 | 1/2003 | Low et al. |
| 2003/0167000 A1 | 9/2003 | Mullick et al. |
| 2003/0214579 A1 | 11/2003 | Iddan |
| 2003/0214580 A1 | 11/2003 | Iddan |
| 2004/0050394 A1 | 3/2004 | Jin |
| 2004/0171914 A1 | 9/2004 | Avni |
| 2005/0036059 A1* | 2/2005 | Goldwasser ............ A61B 1/05 348/373 |
| 2005/0124858 A1 | 6/2005 | Matsuzawa et al. |
| 2006/0004276 A1 | 1/2006 | Iddan et al. |
| 2006/0030754 A1 | 2/2006 | Iddan |
| 2006/0078897 A1 | 4/2006 | Wedinger et al. |
| 2006/0195015 A1 | 8/2006 | Mullick et al. |
| 2007/0250126 A1 | 10/2007 | Maile et al. |
| 2008/0071139 A1 | 3/2008 | Fujita |
| 2008/0114224 A1 | 5/2008 | Bandy et al. |
| 2009/0099418 A1 | 4/2009 | Kimoto |
| 2009/0253999 A1 | 10/2009 | Aoki et al. |
| 2009/0312618 A1 | 12/2009 | Hengerer et al. |
| 2009/0312787 A1 | 12/2009 | Chiba et al. |
| 2010/0010330 A1 | 1/2010 | Rankers et al. |
| 2010/0158705 A1 | 6/2010 | Guinard |
| 2011/0017612 A1 | 1/2011 | Dijksman et al. |
| 2011/0034768 A1 | 2/2011 | Ozaki et al. |
| 2011/0065987 A1 | 3/2011 | Mullick et al. |
| 2011/0166416 A1 | 7/2011 | Katayama et al. |
| 2011/0213205 A1 | 9/2011 | Uchiyama et al. |
| 2011/0282144 A1 | 11/2011 | Gettman |
| 2012/0209074 A1 | 8/2012 | Titus |
| 2012/0266116 A1 | 10/2012 | Ding et al. |
| 2012/0289776 A1 | 11/2012 | Keast et al. |
| 2012/0292911 A1 | 11/2012 | Bolin |
| 2013/0018224 A1 | 1/2013 | Kim et al. |
| 2016/0141485 A1 | 5/2016 | Lee |
| 2017/0119278 A1 | 5/2017 | Hyde et al. |
| 2017/0296092 A1 | 10/2017 | Jones et al. |
| 2017/0316133 A1 | 11/2017 | Abramov |
| 2020/0405129 A1* | 12/2020 | Moyer ..................... H01Q 9/00 |
| 2021/0321863 A1 | 10/2021 | Moyer et al. |

* cited by examiner

INGESTIBLE DEVICE WITH PROPULSION

CROSS-REFERENCE TO RELATED APPLICATIONS

This application claims the benefit of the filing date of provisional U.S. Patent Application No. 63/359,263 filed on Jul. 8, 2022.

FIELD

This disclosure generally relates to capsule endoscopy, and more specifically to a propulsive ingestible device for monitoring in-vivo environments.

BACKGROUND

Capsule endoscopy systems may include a swallowable capsule capturing images of the gastrointestinal tract ("GI" tract or "GIT"). The images may be stored on the capsule and/or transmitted to a receiving device typically including an antenna. The receiving device receives and may store (e.g. within a storage device in the receiving device) the images. Capsule endoscopy allows a medical professional to observe in vivo environments, such as the small intestine, that cannot easily be reached with conventional endoscopes.

SUMMARY

Terms including "generally," "about," "substantially," and the like, as utilized herein, are meant to encompass variations, e.g., manufacturing tolerances, material tolerances, use and environmental tolerances, measurement variations, design variations, and/or other variations, up to and including plus or minus 10 percent.

As used herein, "exemplary" does not necessarily mean "preferred" and may simply refer to an example. As used herein, the term "clinician" refers to any medical professional (e.g., doctor, surgeon, nurse, or the like) or other user involved in operation of the device described herein.

Provided in accordance with aspects of the present disclosure is an ingestible device including a cylindrical capsule having a central axis defined therethrough, a proximal (or rearward) end portion, and an atraumatically shaped distal (or forward) end portion. The ingestible device also includes a propulsion unit disposed at the proximal end portion of the capsule for effecting movement of the capsule within an in vivo environment. The propulsion unit includes a first pair of rotors disposed radially opposite from each other relative to the central axis and a second pair of rotors disposed radially opposite from each other relative to the central axis. The second pair of rotors is disposed proximal to the first pair of rotors along the central axis. The first pair of rotors is offset from the central axis by a first pitch angle and the second pair of rotors is offset from the central axis by a second pitch angle different than the first pitch angle. Each rotor of the first and second pairs of rotors is configured to draw fluid through a corresponding inlet formed in the capsule and discharge the fluid through a corresponding outlet nozzle formed in the capsule to propel the capsule.

In an aspect of this disclosure, the first pitch angle is greater than the second pitch angle.

In another aspect of this disclosure, the first pitch angle is about 10° and the second pitch angle is about 5°.

In yet another aspect of this disclosure, the first and second pitch angles are equal to each other.

In still another aspect of this disclosure, the first pair of rotors is configured to generate thrust in a first direction and the second pair of rotors is configured to generate thrust in a second direction different than the first direction.

In still yet another aspect of this disclosure, the second pair of rotors is larger than the first pair of rotors.

In another aspect of this disclosure, each of the corresponding outlet nozzles is disposed along a radial plane orthogonal to the central axis.

Provided in accordance with another aspect of the present disclosure is an ingestible device including a cylindrical capsule having a central axis defined therethrough, a proximal end portion, and an atraumatically shaped distal end portion. The ingestible device also includes a propulsion unit disposed at the proximal end portion of the capsule for effecting movement of the capsule within an in vivo environment. The propulsion unit includes three rotors arranged radially about the central axis of the capsule in a triangular configuration. Each of the three rotors is configured to draw fluid through a corresponding inlet formed in the capsule and discharge the fluid through a corresponding outlet nozzle formed in the capsule to propel the capsule.

In an aspect of this disclosure, each of the corresponding outlet nozzles is disposed along a radial plane orthogonal to the central axis.

In another aspect of this disclosure, the three rotors are disposed along a radial plane orthogonal to the central axis.

Provided in accordance with another aspect of the present disclosure is an ingestible device including a cylindrical capsule having a central axis defined therethrough, a proximal end portion, and an atraumatically shaped distal end portion. The ingestible device also includes a propulsion unit disposed at the proximal end portion of the capsule for effecting movement of the capsule within an in vivo environment. The propulsion unit includes a rotor coaxial with the central axis of the capsule and a steering unit disposed at the proximal end portion of the capsule and configured to steer the capsule while the propulsion unit propels the capsule.

In an aspect of this disclosure, the steering unit includes a cam gear disposed coaxial with the central axis and having a plurality of steering paddles disposed distal to the rotor and configured to rotate about the central axis relative to the propulsion unit to control steering of the capsule.

In another aspect of this disclosure, the cam gear defines an aperture coaxial with the central axis and the propulsion unit is configured to be received through the aperture.

In yet another aspect of this disclosure, the plurality of steering paddles includes three steering paddles radially spaced equidistant from each other.

In still yet another aspect of this disclosure, the plurality of steering paddles are disposed radially offset from the central axis.

In another aspect of this disclosure, the steering unit includes a steering motor coupled to the cam gear via a drive gear and the steering motor is configured to drive rotation of the drive gear to, in turn, drive rotation of the cam gear for rotating the steering paddles about the central axis.

In yet another aspect of this disclosure, the steering motor extends distally from the cam gear.

In yet another aspect of this disclosure, the ingestible device also includes a protective cage disposed at the proximal end portion of the capsule and configured to house the propulsion unit and the steering unit.

In still yet another aspect of this disclosure, the protective cage has a cross-type configuration.

In another aspect of this disclosure, the propulsion unit includes a drive motor configured to supply motive power to the rotor.

BRIEF DESCRIPTION OF THE DRAWINGS

The above and other aspects and features of this disclosure will become more apparent in view of the following detailed description when taken in conjunction with the accompanying drawings wherein like reference numerals identify similar or identical elements.

DETAILED DESCRIPTION

Figure 1A:
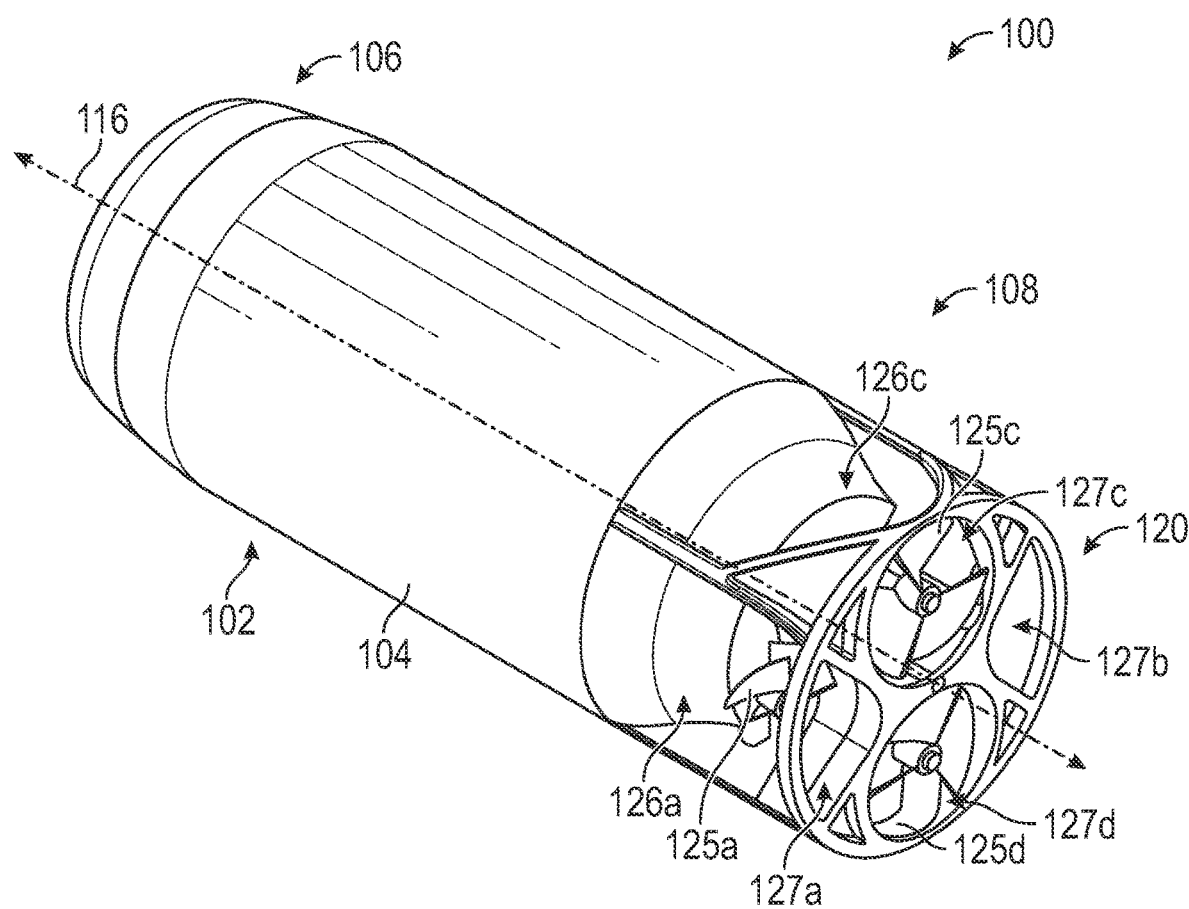
FIG. 1A shows a perspective view of an ingestible device in accordance with an embodiment of this disclosure.

Capsule endoscopy allows medical professionals to observe in vivo environments, such as the small intestine, that cannot easily be reached with conventional endoscopes. However, capsule endoscopy remains a relatively uncommon procedure. One reason for this is the lack of control over the camera following ingestion of the capsule. Areas of interest can be missed by the camera due to the orientation of the capsule as it naturally travels through the digestive tract. Another reason is that the devices used for capsule endoscopy can take several hours to reach the target anatomy and then several more hours to record imagery. Then, the patient may need to return to a medical setting (e.g., a hospital or clinic) to deliver the recorded imagery.

To overcome the aforementioned challenges, disclosed herein are ingestible devices with various configurations for controlling movement and/or maneuvering of the ingested device to move and orientate the ingestible device relative to an area of interest within the in vivo environment. One such ingestible device configuration is a propulsive ingestible device including a capsule, a camera disposed within the capsule, and one or more propulsion components and propulsion control elements. The ingestible device is configured to propel itself through a living body. The ingestible device may also include one or more illumination sources for illuminating a body lumen, one or more transmitters for transmitting image information to a receiver, and a power source (e.g., battery). The receiver may be configured to transfer, to a data processor, image information that is transmitted from the capsule.

The camera can generate images as the ingestible device traverses the gastrointestinal tract. Images generated by the camera are forwarded to the transmitter for transmission to an electronic device located outside of the living body. In some embodiments, the images are transmitted to the electronic device in real time so that a medical professional can take appropriate action(s) based on the content of the images. For example, the medical professional may discover an area of interest that requires further examination upon reviewing the images. In such a scenario, the propulsion component(s) can orient the propulsive ingestible device so that the camera is focused on the area of interest. Such action may enable the ingestible device to gather additional data (e.g., in the form of images, biological measurements, etc.) regarding the area of interest.

Embodiments may be described with reference to particular capsule shapes and/or propulsion components. However, those skilled in the art will recognize that the features of these embodiments are equally applicable to other capsule shapes and/or propulsion components. For example, although a feature may be described in the context of an ingestible device that has a single propulsor or multiple propulsors, the feature may be embodied in an ingestible device having another type of propulsor, or propulsors in a different arrangement, or a combination of these variations.

Figure 1B:
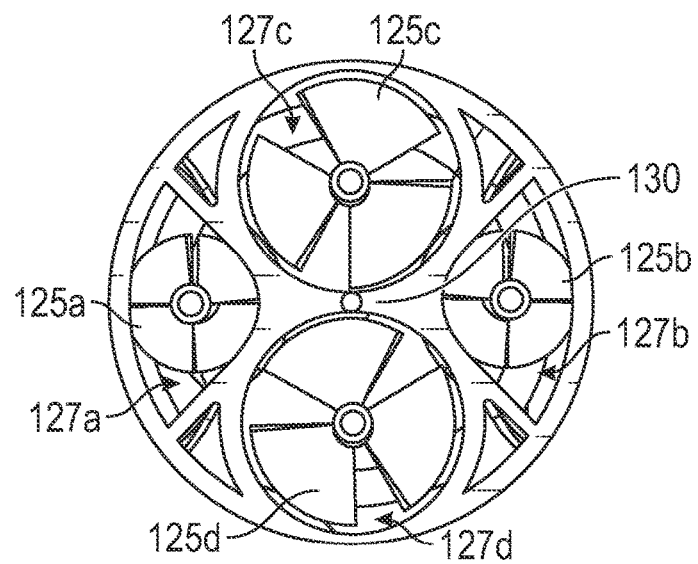
FIG. 1B shows a rear view of the ingestible device of FIG. 1A.

FIGS. 1A-1B include perspective and rear views, respectively, of an embodiment of an ingestible device 100 configured to monitor in vivo environments as it travels through a living body, such as a human body or an animal body. Note that illustrations in this disclosure are not drawn to scale and are shown significantly enlarged for greater clarity. The ingestible device 100 generally includes a capsule 102 with a cylindrical body 104, an atraumatically shaped distal (or forward) end portion 106 shaped to minimize hydrodynamic drag, and a proximal (or rearward) end portion 108 including a propulsion unit 120 having one or more propulsors embodied as rotors 125a-d. The distal end portion 106 may include an optical sensor (not shown) for capturing images and/or video as the ingestible device travels through the body. In some embodiments, the optical sensor is a camera and the distal end portion 106 in which the camera is mounted may be made of a transparent plastic to prevent the camera from exposure to the in-vivo environment while not distorting optical data or obstructing the camera from imaging the in-vivo environment. The proximal end portion 108 includes a stem structure 130 separating the rotors 125a-d, which may include an optical sensor (e.g., a backward facing camera, not shown) mounted therein for capturing images and/or video from the proximal end portion 108. The capsule 102 may include a coating that inhibits exposure of the internal components of the capsule 102 to the in-vivo environment.

In FIGS. 1A-1B, the rotors 125a-d are capable of drawing fluid through an intake formed in the capsule 102. The term "rotor," as used herein, refers to a component that is capable of rotating to create propulsive force that imparts momentum to the surrounding fluid(s) to produce movement. An example of a rotor is a propeller. However, other propulsors could be used instead of, or in addition to, the rotors. Examples of propulsion components include helicoids, fins, lash-like appendages (also referred to as "flagellum"), undulating mechanisms, etc. Moreover, propulsion components could be arranged along the cylindrical body of the capsule instead of, or in addition to, in the proximal end portion 108.

The ingestible device 100 may include one or more propulsion components. Each propulsion component can include a propulsor configured to generate a propulsive force for moving the ingestible device and an energy-to-movement converter (not shown) configured to supply motive power to the propulsor. In the embodiment of FIGS. 1A and 1B, for example, the propulsion unit 120 includes four rotors 125a-d that are driven by four motors (not shown) located in the capsule 102. In some embodiments, each propulsor is driven by a different mechanical power converter. In other embodiments, multiple propulsors may be driven by a single energy-to-movement converter. For example, a single motor may be responsible for supplying motive power to multiple propulsors, though the speed of each propulsor may be varied through a mechanical connection (e.g., a clutch system or a gear system).

Figure 1C:
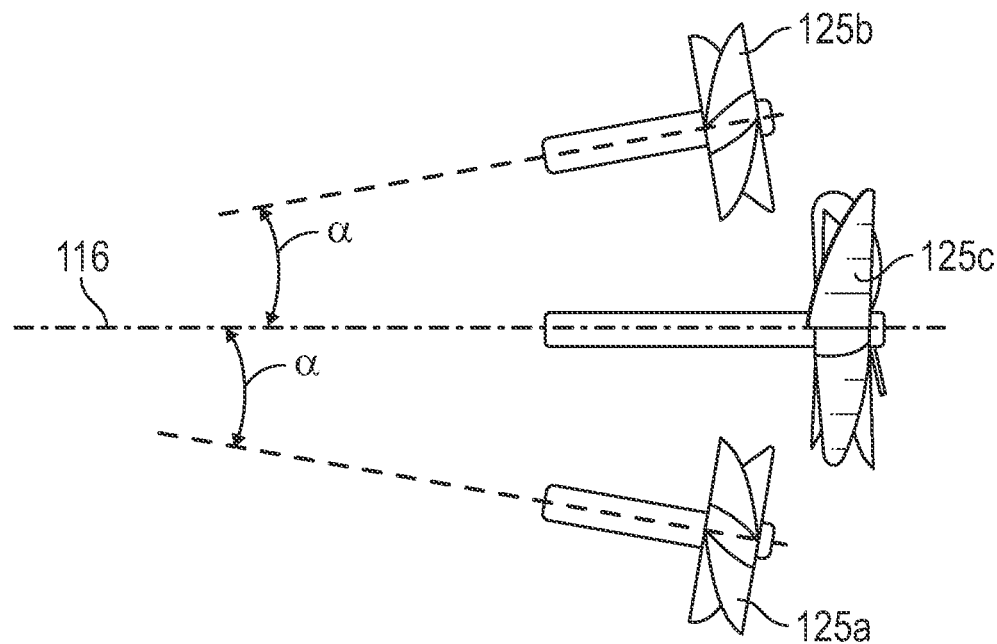
FIGS. 1C and 1D show top and side views, respectively, of rotors of the ingestible device of FIG. 1A with the remainder of the ingestible device removed to illustrate an arrangement of the rotors in accordance with aspects of this disclosure.
Figure 1D:
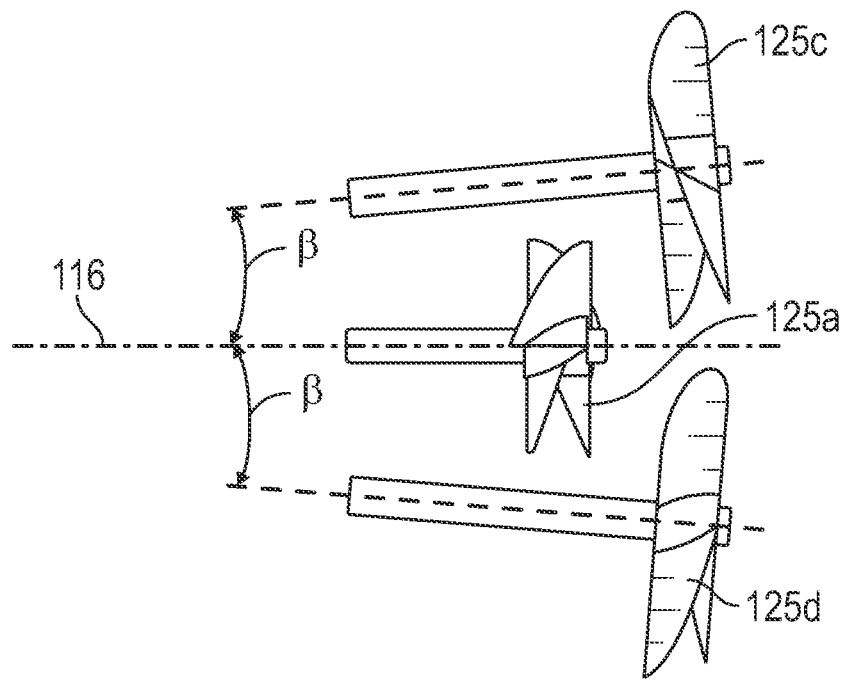

Multiple rotors 125a-d can be arranged to facilitate movement along different axes. With reference to FIGS. 1A-1C, for example, four rotors 125a-d are arranged radially about a central axis 116 defined through the capsule 102 in a cross-type configuration. More specifically, these rotors 125a-d are disposed at locations radially offset from the central axis 116 and at different angular offsets about the central axis 116. With reference to the top view of FIG. 1C and the side view of FIG. 1D, for example, rotors 125a and 125b may be offset from the central axis 116 by a fixed pitch angle α and rotors 125c and 125d may be offset from the central axis 116 by a fixed pitch angle β. As shown in FIGS. 1C-1D, pitch angle α may be greater than pitch angle β. However, in some embodiments, pitch angle α may be less than or equal to pitch angle β. In one specific embodiment, pitch angle α may be about 10° and pitch angle β may be about 5°.

By independently driving the rotors 125a-d, movement can be achieved in any direction or orientation. Accordingly, the ingestible device 100 may be commanded to move forward and backward at different speeds. Moreover, the ingestible device 100 may be commanded to change its orientation through rotation about three mutually perpendicular axes. These changes in orientation and forward/backward motions can be converted into variations in yaw (normal axis), pitch (transverse axis), and roll (longitudinal axis), and therefore movement to any location can be represented in three-dimensional space.

As noted above, the ingestible device 100 can include one or more propulsors for controlling movement along three mutually perpendicular axes. In the embodiment of FIGS. 1A and 1B, for example, the ingestible device 100 includes four rotors 125a-d arranged radially about the capsule 102 orthogonal to the central axis 116. The four rotors 125a-d may include a first pair of rotors 125a-b arranged radially opposite each other relative to the central axis 116 and a second pair of rotors 125c-d arranged radially opposite each other relative to the central axis 116. Each pair of propulsors may be configured to share a common thrust direction; for example, the rotors 125a-b may both generate forward thrust when rotating clockwise relative to the central axis 116. Simultaneously, the rotor pairs may be configured to have opposite thrust direction; for example, rotors 125a-b may generate forward thrust while rotors 125c-d may generate backward thrust when all four rotors 125a-d are rotating clockwise relative to the central axis 116. As shown in FIG. 1B, the first and second pairs of rotors 125a-d may be arranged in a cross-type configuration so that neighboring rotors rotate in opposite directions to produce thrust in the same direction, while radially opposite rotors rotate in the same direction to produce thrust in the same direction. Such a configuration allows independent control of thrust, pitch, yaw, and roll through the combination of the effects of the individual rotors. In some embodiments, one pair of propulsors may serve as maneuvering rotors for maneuvering the capsule 102 while the other pair of propulsors may serve as propulsion rotors for providing propulsion to the capsule 102. For example, the first pair of rotors 125a-b may be smaller in size than the second pair of rotors 125c-d and be positioned distally relative to the second pair of rotors 125c-d, as shown in FIG. 1B. For example, the first pair of rotors 125a-b may have propeller blades having a smaller surface area, a different shape and/or camber than corresponding propeller blades of the second pair of rotors 125c-d. The relatively smaller size of the first pair of rotors 125a-b results in different hydrodynamic effects relative to the larger second pair of rotors 125c-d. The hydrodynamic effect of the relatively smaller rotors enables the capsule 102 to be controlled with more precise movements such that the capsule 102 can be orientated to focus the camera on an area of interest within the gastrointestinal tract. The relatively larger second pair of rotors 125c-d may serve to provide a more powerful propulsion compared to the first pair of rotors 125a-b for effecting general movement of the capsule 102 (e.g., forward/backward thrust). As shown in FIGS. 1C-D, the second pair of rotors 125c-d are positioned proximally (or rearward) of the first pair of rotors 125a-b.

Each rotor may be located in a different channel defined through the capsule 102, and each channel may include an inlet 126a-d through which fluid is drawn by the corresponding rotor and an outlet nozzle 127a-d through which the fluid is discharged by the corresponding rotor. Generally, the channels are defined through the capsule 102 in a direction substantially parallel to the central axis 116. When in operation, the rotors 125a-d can draw fluid through the inlets 126a-d to create flows that propel the ingestible device 100 in a particular direction. In the example of FIGS. 1A-B, each of the outlet nozzles 127a-d is disposed along a radial plane orthogonal to the central axis 116.

In some embodiments, each rotor is designed to rotate in a primary direction and a secondary direction. For example, the first pair of rotors 125a-b may be configured to be able to rotate in the clockwise and counterclockwise directions in relation to the central axis 116. Similarly, the second pair of rotors 125c-d may be able to rotate in the counterclockwise and clockwise directions in relation to the central axis 116. Generally, when an even number of rotors (e.g., 2, 4, 6) are employed, body roll may be avoided by rotating certain rotors in the clockwise direction and other rotors in the counterclockwise direction. Maneuverability of the capsule 102 may be obtained by speed changes in one or more of the rotors 125a-d causing an off-center thrust, which causes the capsule to yaw.

Figure 3A:
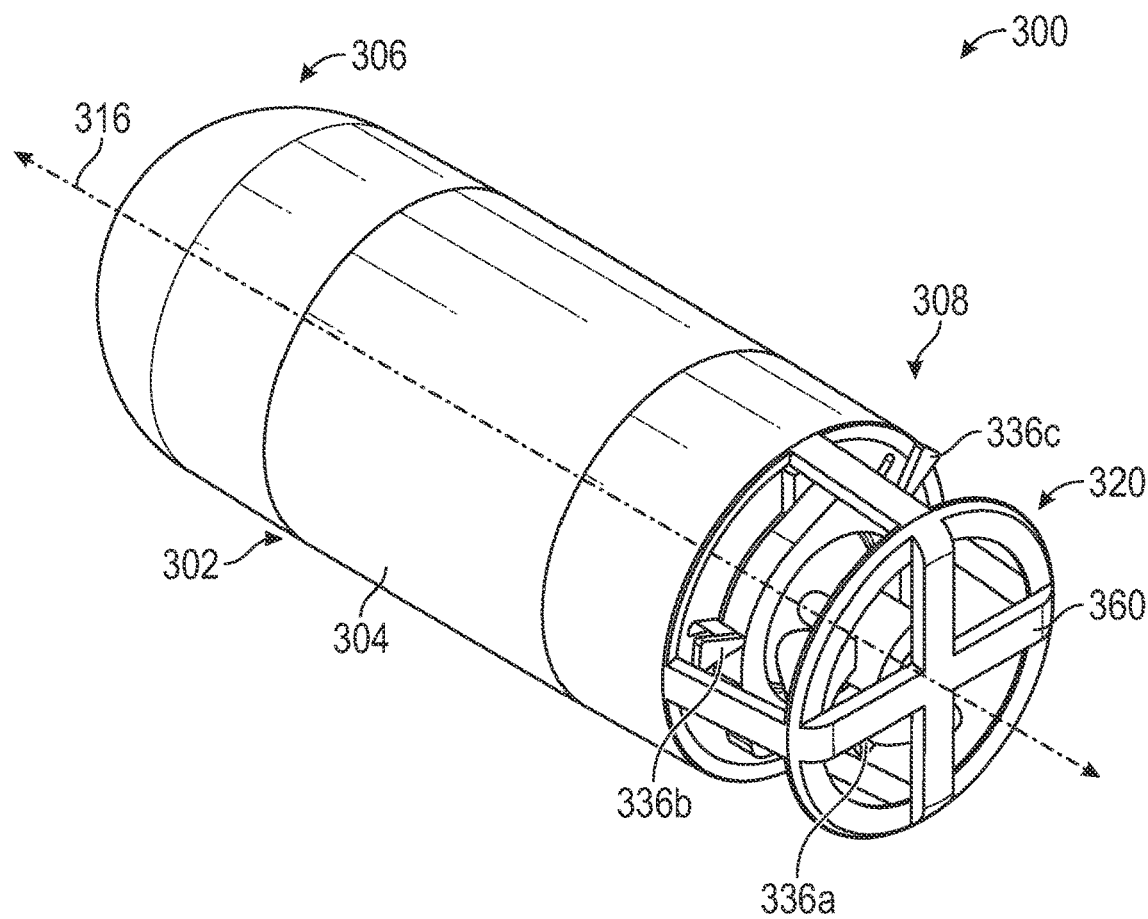
FIG. 3A shows a perspective view of an ingestible device in accordance with another embodiment of this disclosure.
Figure 3B:
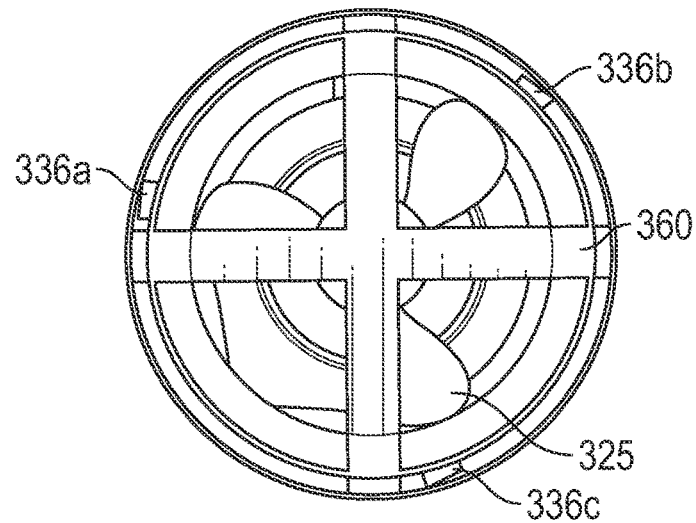
FIG. 3B shows a rear view of the ingestible device of FIG. 3A.
Figure 3C:
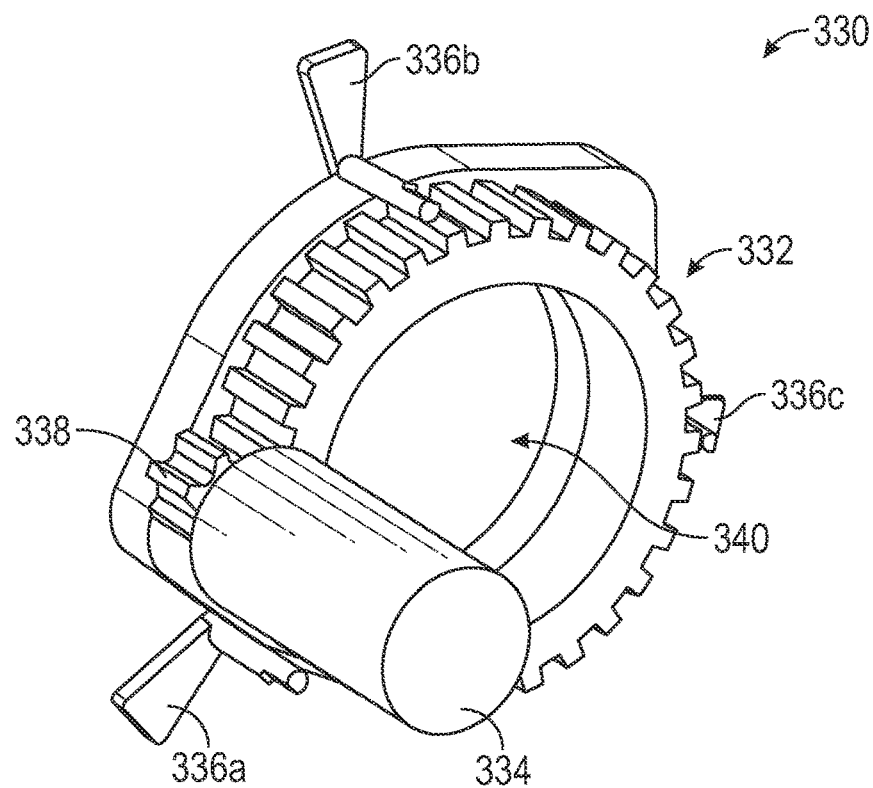
FIG. 3C is a rear, perspective view of a steering mechanism of the ingestible device of FIG. 3A.
Figure 3D:
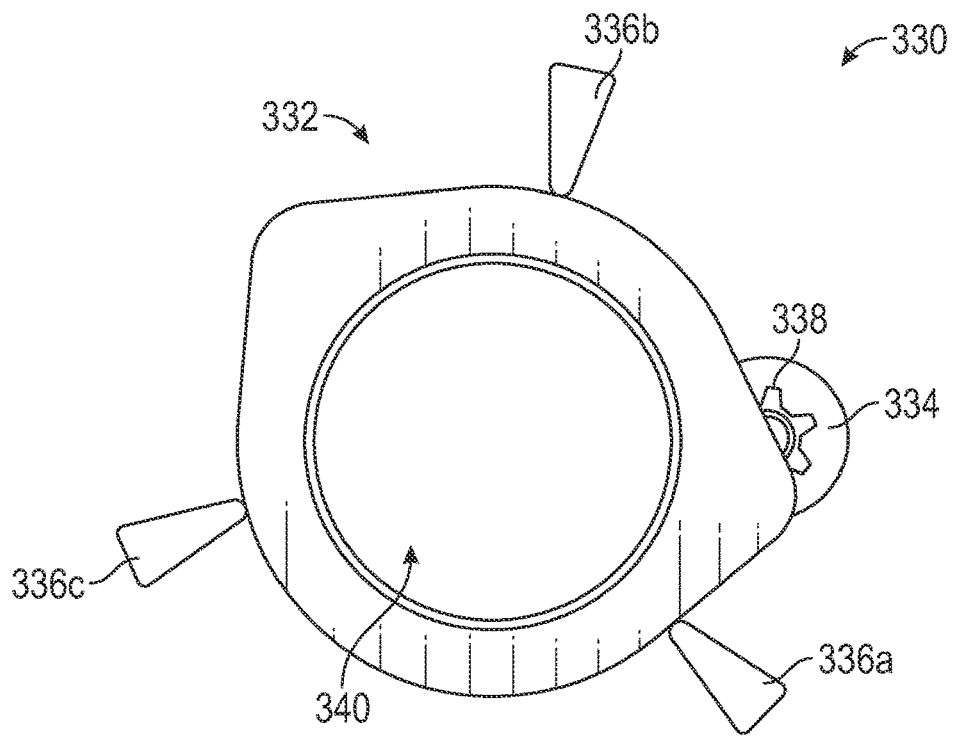
FIG. 3D is a front, perspective view of the steering mechanism of FIG. 3A.
Figure 3E:
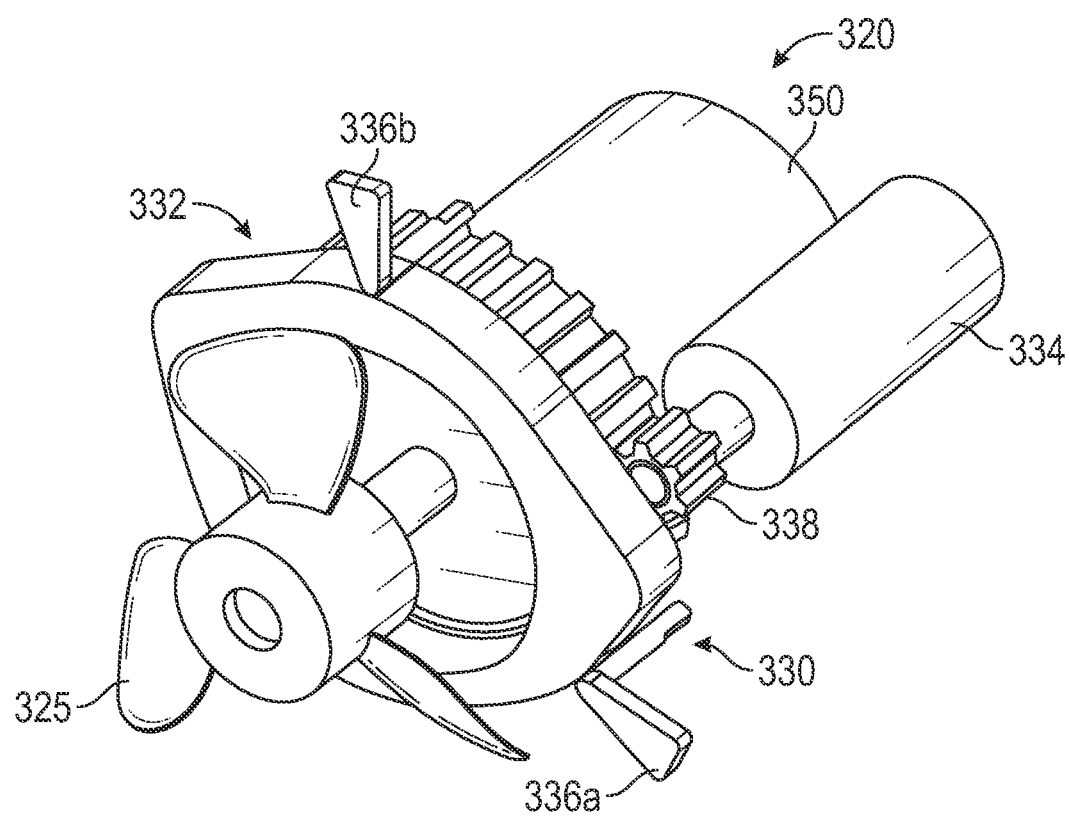
FIG. 3E is a front, perspective view of the steering mechanism of FIGS. 3C and 3D coupled to a propulsion unit of the ingestible device of FIG. 3A.

The capsule 102 can be fitted with one, two, three, four, or more rotors depending on the speed and maneuvering requirements of the ingestible device 100. In FIGS. 1A-B, for example, four rotors 125a-d are arranged in a cross-type configuration within the proximal end portion 108 of the capsule 102. In another embodiment shown in FIGS. 3A-3B, a single rotor is arranged in the proximal end portion of the capsule along the central axis of the capsule. In another embodiment shown in FIGS. 4A-4B, three rotors are arranged in a triangular configuration about the central axis of the capsule. Other embodiments including a three rotor arrangement are shown in FIGS. 5A-B and 6A-B, respectively. Generally, when an odd number of rotors (e.g., 1, 3, 5) is employed, body rolling may be expected. When a single rotor is employed, in particular, rapid body rolling is expected and maneuverability may be obtained by a selective blocking of the outflow generated by the single rotor. When three rotors are employed, one of the three rotors may be used to oppose the rolling while maneuverability may be obtained by selectively changing rotation speeds of one or more of the three rotors.

Each rotor may be independently driven by a different motor. In FIGS. 1A-B, for example, the ingestible device 100 may include four motors (not shown) configured to supply motive power to the four rotors 125a-d. In other embodiments, multiple rotors may be driven by a single mechanical power converter. For example, a single motor may be responsible for supplying motive power to the first pair of rotors 125a-b, though the speed of these rotors may be varied through a mechanical connection (e.g., a clutch system or a gear system).

Figure 2A:
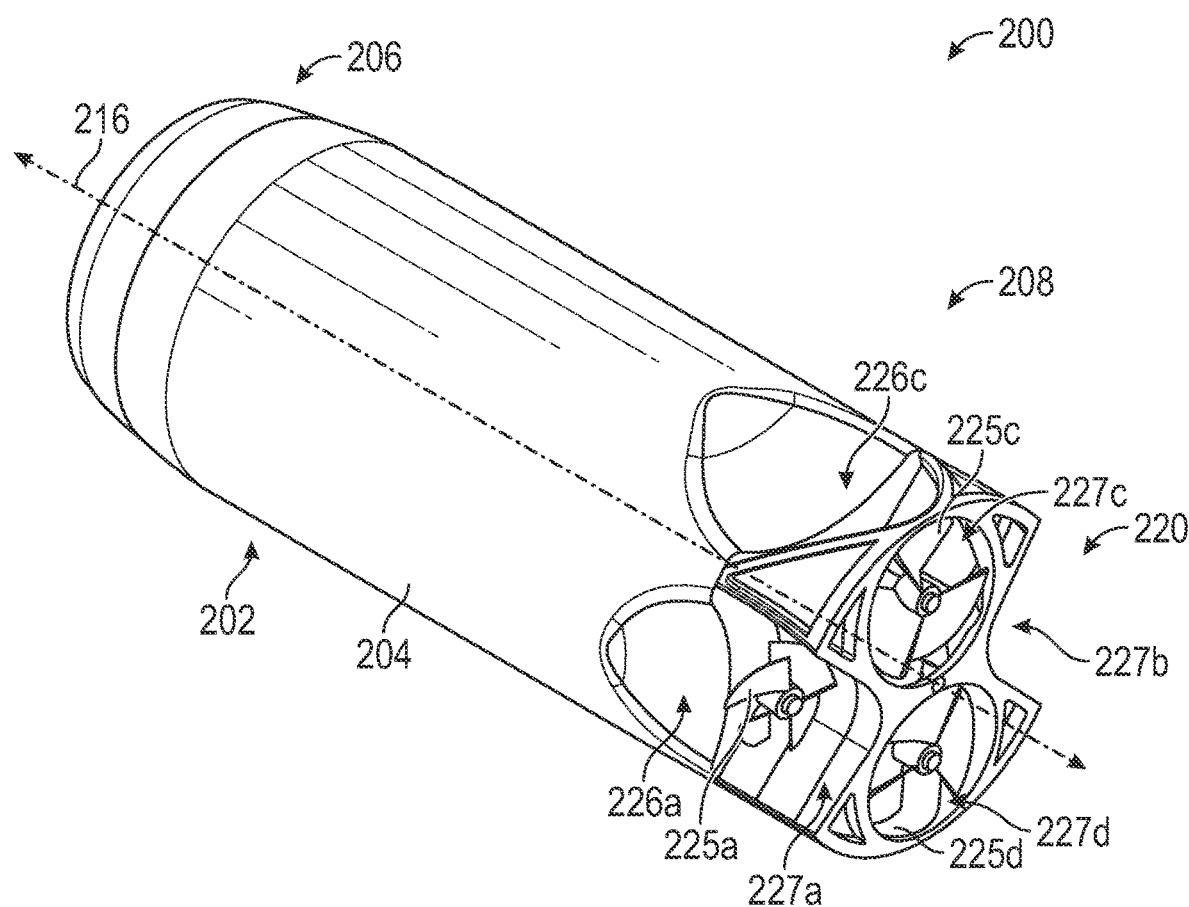
FIG. 2A shows a perspective view of an ingestible device in accordance with another embodiment of this disclosure.
Figure 2B:
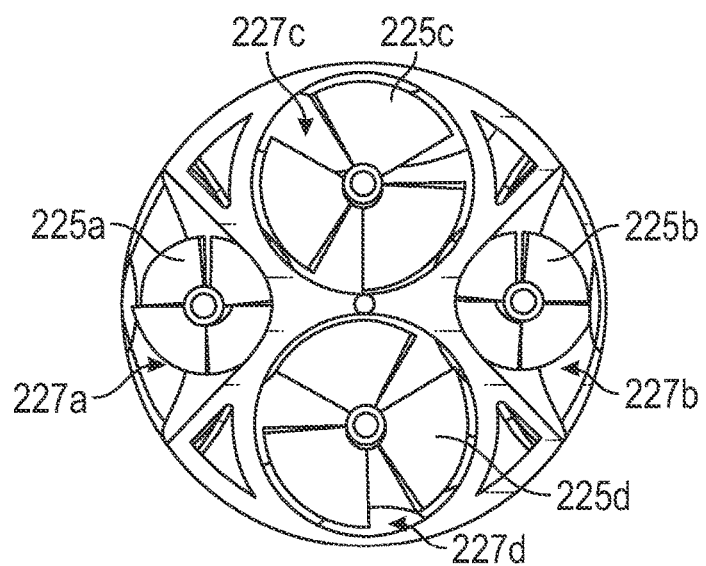
FIG. 2B shows a rear view of the ingestible device of FIG. 2A.

FIGS. 2A and 2B show another embodiment of an ingestible device 200 having a four-rotor arrangement. The ingestible device 200 generally includes a capsule 202 with a cylindrical body 204, an atraumatically shaped distal (or forward) end portion 206, and a proximal (or rearward) end portion 208 including a propulsion unit 220 having four rotors 225a-d arranged radially about a central axis 216 defined through the capsule 202 in a cross-type configuration. The ingestible device 200 is substantially similar to the ingestible device 100 and will only be discussed in detail herein to the extent necessary to identify difference in construction and operation. As similarly described above with respect to FIGS. 1A and 1B, each rotor may be located in a different channel defined through the capsule 202, and each channel may include an inlet 226a-d through which fluid is drawn by the corresponding rotor and an outlet nozzle 227a-d through which the fluid is discharged by the corresponding rotor. Generally, the channels are defined through the capsule 202 in a direction substantially parallel to the central axis 216. When in operation, the rotors 225a-d can draw fluid through the inlets 226a-d to create flows that propel the ingestible device 200 in a particular direction. As shown in FIG. 2A, the inlets 226a-d and outlet nozzles 227a-d of the ingestible device 200 are sized and/or shaped differently than the respective inlets 126a-d and outlet nozzles 127a-d of the ingestible device 100.

With reference to FIGS. 3A-E, another embodiment of an ingestible device 300 is shown having a single rotor arrangement. The ingestible device 300 generally includes a capsule 302 with a cylindrical body 304, an atraumatically shaped distal end portion 306, and a proximal end portion 308 including a propulsion unit 320 having a single drive motor 350 coupled to a single rotor 325 coaxial with a central axis 316 defined through the capsule 202. The propulsion unit 320 is coupled to a steering unit 330 (FIGS. 3C-3E) having a cam gear 332 coupled to a steering motor 334. The propulsion unit 320 is received longitudinally through an aperture 340 defined by the cam gear 332 and configured to be coaxial with the central axis 316, such that the cam gear is configured to rotate relative to the propulsion unit about the central axis 316 of the ingestible device 300. Extending radially from an outer periphery of the cam gear 332 are a plurality of radially-spaced steering paddles 336a-c that are radially offset from the central axis 316 and configured to steer (e.g., similar to a tail rudder of a submarine) the ingestible device 300 during propulsion caused by the rotor 325. The steering motor 334 is coupled to a drive gear 338 interfaced with the cam gear 332. In operation, the steering motor 334 drives rotation of the drive gear 338, which in turn drives rotation of the cam gear 332 relative to the propulsion unit 320 about the central axis 316. Rotation of the cam gear 332 serves to rotate the steering paddles 336a-c about the central axis 316 into various radial positions relative to the central axis 316 to control steering of the ingestible device 300. The cam gear 332 and steering paddles 336a-c are positioned distal to the rotor 325. This configuration ensures that the flow of fluid incident on the surfaces of the steering paddles 336a-c is relatively undisturbed resulting in optimized steering control, as opposed to a relatively more turbulent flow of fluid caused by ejection of fluid of the rotor 325, which may inhibit steering control. While three steering paddles 336a-c are shown, the cam gear 332 may include less or more steering paddles depending on the maneuvering requirements of the ingestible device 300. In some embodiments, the three steering paddles 336a-c may be radially spaced equidistant from each other.

The proximal end portion 308 includes a protective cage 360 extending proximally from the cylindrical body to house the propulsion unit 320 and the steering unit 340. The protective cage 360 has a cross-type configuration that prevents the rotor 325 from damaging tissue within the patient's gastrointestinal tract while providing an optimized through flow for fluid drawn and ejected by the rotor 325.

Figure 4A:
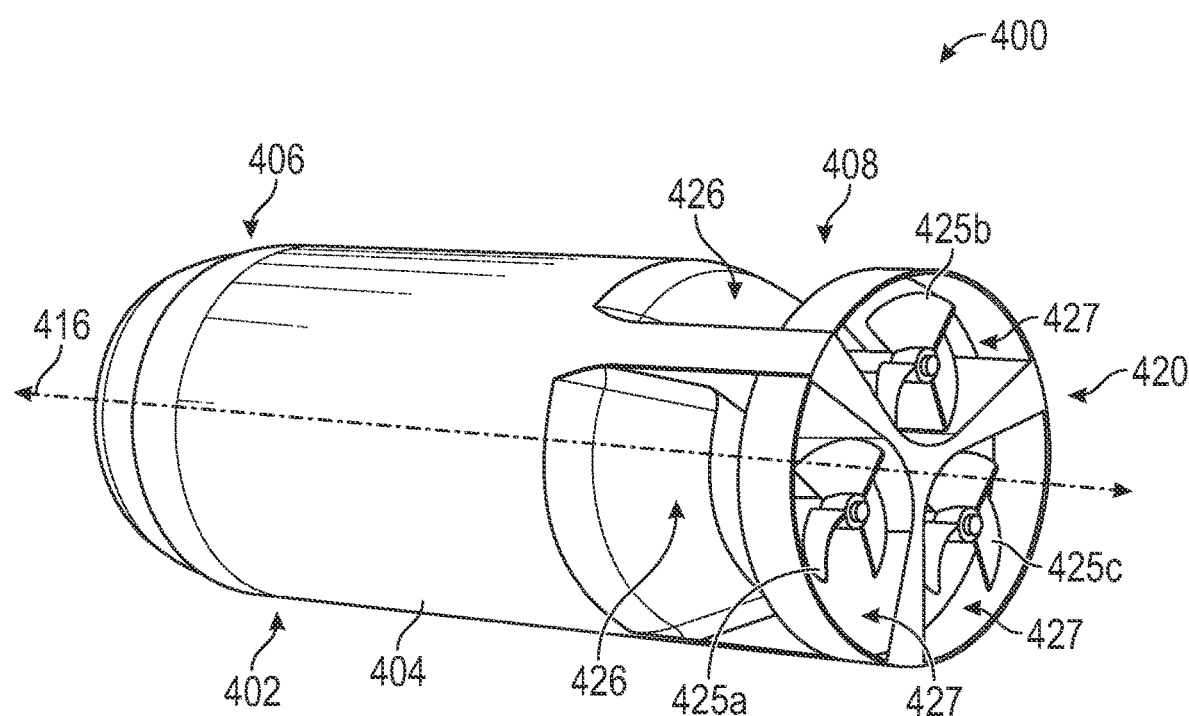
FIG. 4A shows a perspective view of an ingestible device in accordance with another embodiment of this disclosure.
Figure 4B:
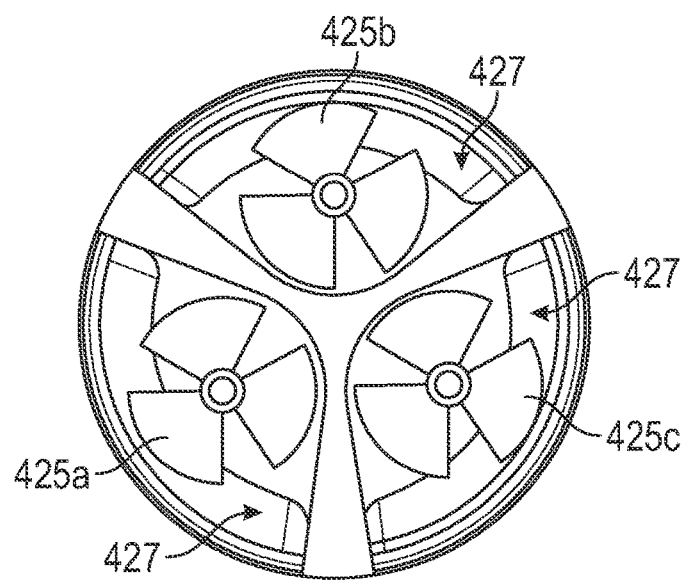
FIG. 4B shows a rear view of the ingestible device of FIG. 4A.

FIGS. 4A and 4B shows another embodiment of an ingestible device 400 having a three-rotor arrangement. The ingestible device 400 generally includes a capsule 402 with a cylindrical body 404, an atraumatically shaped distal end portion 406, and a proximal end portion 408 including a propulsion unit 420 having three rotors 425a-c arranged radially about a central axis 416 defined through the capsule 402 in a triangular configuration. As similarly described above with respect to FIGS. 1A and 1B, each rotor may be located in a different channel defined through the capsule 402, and each channel may include an inlet 426 through which fluid is drawn by the corresponding rotor and an outlet nozzle 427 through which the fluid is discharged by the corresponding rotor. Generally, the channels are defined through the capsule 402 in a direction substantially parallel to the central axis 416. When in operation, the rotors 425 can draw fluid through the inlets 426 to create flows that propel the ingestible device 400 in a particular direction. In the example of FIGS. 4A-B, the three rotors 425a-c are disposed along a radial plane orthogonal to the central axis 416. In some embodiments, one of the three rotors may rotate in the opposite rotational direction from the other two rotors to reduce body roll (e.g., rotors 425a and 425b rotate clockwise and rotor 425c rotates counter clock-wise). As similarly described above with respect to FIGS. 1C and 1D, the rotors 425a-c in some embodiments may be disposed at locations radially offset from the central axis 416 and at particular angular offsets about the central axis 416. For example, all three rotors 425a-c may be offset from the central axis 416 by the same fixed pitch angle. Alternatively, one of the rotors (e.g., 425a) may be offset from the central axis 416 by a first fixed pitch angle and the other two rotors (e.g., 425b and 425c) may be offset from the central axis 416 by a second fixed pitch angle that is different than the first fixed pitch angle.

Figure 5A:
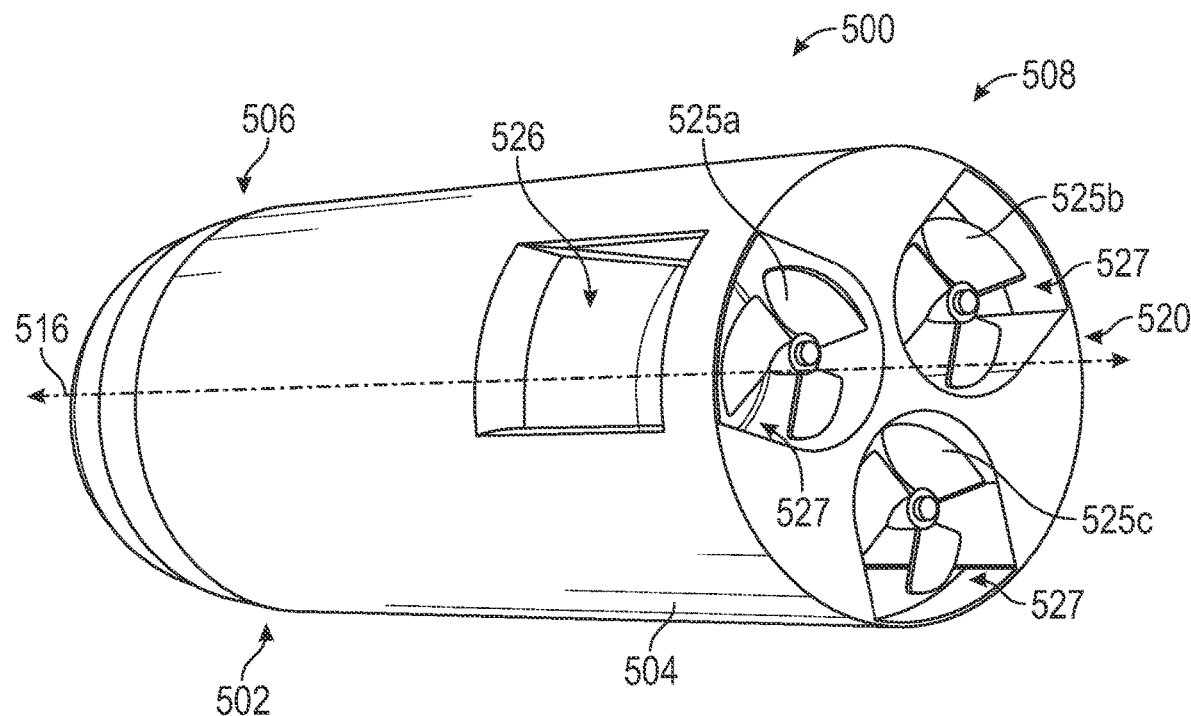
FIG. 5A shows a perspective view of an ingestible device in accordance with another embodiment of this disclosure.
Figure 5B:
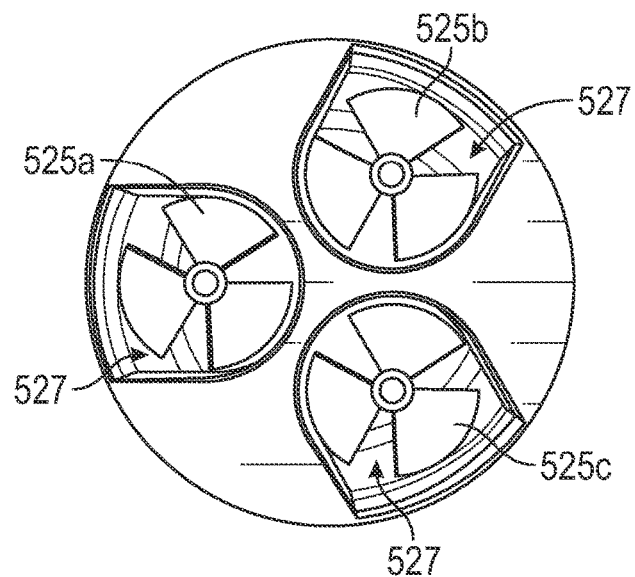
FIG. 5B shows a rear view of the ingestible device of FIG. 5A.

FIGS. 5A and 5B shows another embodiment of an ingestible device 500 having a three-rotor arrangement. The ingestible device 500 is substantially similar to the ingestible device 400 and will only be discussed in detail herein to the extent necessary to identify difference in construction and operation. The ingestible device 500 generally includes a capsule 502 with a cylindrical body 504, an atraumatically shaped distal end portion 506, and a proximal end portion 508 including a propulsion unit 520 having three rotors 525a-c arranged radially about a central axis 516 defined through the capsule 502 in a triangular configuration. As similarly described above with respect to FIGS. 1A and 1B, each rotor may be located in a different channel defined through the capsule 502, and each channel may include an inlet 526 through which fluid is drawn by the corresponding rotor and an outlet nozzle 527 through which the fluid is discharged by the corresponding rotor. Generally, the channels are defined through the capsule 502 in a direction substantially parallel to the central axis 516. When in operation, the rotors 525a-c can draw fluid through the inlets 526 to create flows that propel the ingestible device 500 in a particular direction. As shown in FIG. 5A, the inlets 526 and outlet nozzles 527 of the ingestible device 500 are sized and/or shaped differently than the respective inlets 426 and outlet nozzles 427 of the ingestible device 400. In the example of FIGS. 5A-B, each of the outlet nozzles 527 is disposed along a radial plane orthogonal to the central axis 516. In some embodiments, one of the three rotors may rotate in the opposite rotational direction from the other two rotors to reduce body roll (e.g., rotors 525a and 525b rotate clockwise and rotor 525c rotates counter clock-wise). As similarly described above with respect to FIGS. 1C and 1D, the rotors 525a-c in some embodiments may be disposed at locations radially offset from the central axis 516 and at particular angular offsets about the central axis 516. For example, all three rotors 525a-c may be offset from the central axis 516 by the same fixed pitch angle. Alternatively, one of the rotors (e.g., 525a) may be offset from the central axis 516 by a first fixed pitch angle and the other two rotors (e.g., 525b and 525c) may be offset from the central axis 516 by a second fixed pitch angle that is different than the first fixed pitch angle.

Figure 6A:
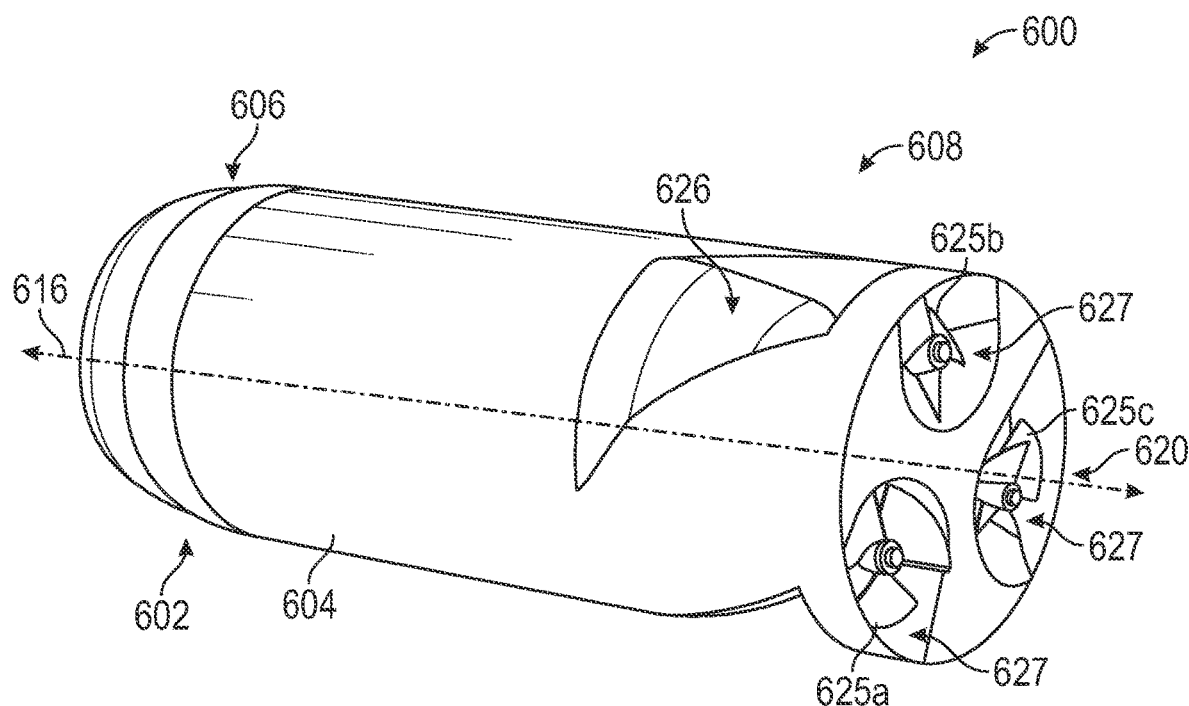
FIG. 6A shows a perspective view of an ingestible device in accordance with another embodiment of this disclosure.
Figure 6B:
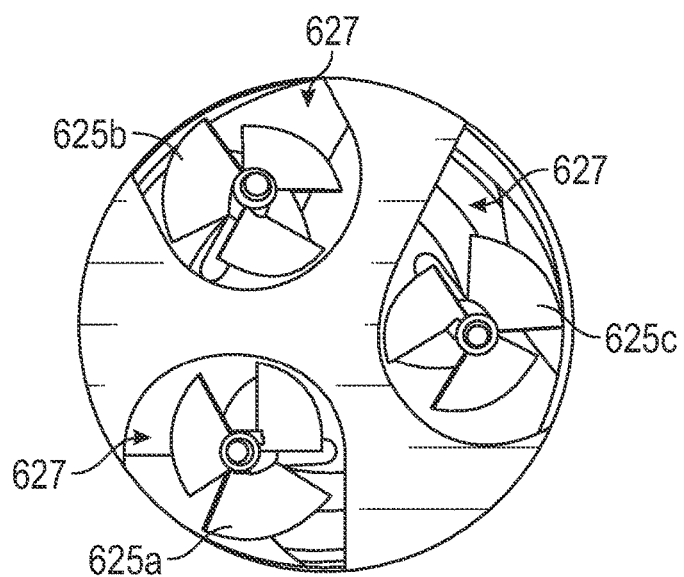
FIG. 6B shows a rear view of the ingestible device of FIG. 6A.

FIGS. 6A and 6B shows another embodiment of an ingestible device 600 having a three-rotor arrangement. The ingestible device 600 is substantially similar to the ingestible device 400 and the ingestible device 500 and will only be discussed in detail herein to the extent necessary to identify difference in construction and operation. The ingestible device 600 generally including a capsule 602 with a cylindrical body 604, an atraumatically shaped distal end portion 606, and a proximal end portion 608 including a propulsion unit 620 having three propulsors 625a-c embodied as rotors and arranged radially about a central axis 616 defined through the capsule 602 in a triangular configuration. As similarly described above with respect to FIGS. 1A and 1B, each rotor may be located in a different channel defined through the capsule 602, and each channel may include an inlet 626 through which fluid is drawn by the corresponding rotor and an outlet nozzle 627 through which the fluid is discharged by the corresponding rotor. Generally, the channels are defined through the capsule 602 in a direction substantially parallel to the central axis 616. When in operation, the rotors 625a-c can draw fluid through the inlets 626 to create flows that propel the ingestible device 600 in a particular direction. As shown in FIG. 6A, the inlets 626 and outlet nozzles 627 of the ingestible device 600 are sized and/or shaped differently than the respective inlets 426 and outlet nozzles 427 of the ingestible device 400 (FIGS. 4A-4B) and the respective inlets 526 and outlet nozzles 527 of the ingestible device 500 (FIG. 5A-5B). In the example of FIGS. 6A-B, each of the outlet nozzles 627 is disposed along a radial plane orthogonal to the central axis 616 and the particular angle at which each of the inlets 626 are disposed with respect to the central axis 616 serves to reduce body roll that may occur during use of a three-rotor arrangement.

It should be understood that various aspects disclosed herein may be combined in different combinations than the combinations specifically presented hereinabove and in the accompanying drawings. While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. An ingestible device, comprising:
a cylindrical capsule having a central axis defined therethrough, the capsule including a proximal end portion and an atraumatically shaped distal end portion; and
a propulsion unit disposed at the proximal end portion of the capsule for effecting movement of the capsule within an in vivo environment, the propulsion unit including:
a first pair of rotors disposed radially opposite from each other relative to the central axis; and
a second pair of rotors disposed radially opposite from each other relative to the central axis, the second pair of rotors disposed proximal to the first pair of rotors along the central axis, wherein the first pair of rotors is offset from the central axis by a first pitch angle and the second pair of rotors is offset from the central axis by a second pitch angle different than the first pitch angle,
wherein each rotor of the first and second pairs of rotors is configured to draw fluid through a corresponding inlet formed in the capsule and discharge the fluid through a corresponding outlet nozzle formed in the capsule to propel the capsule.

2. The ingestible device according to claim 1, wherein the first pitch angle is greater than the second pitch angle.

3. The ingestible device according to claim 1, wherein the first pitch angle is about 10° and the second pitch angle is about 5°.

4. The ingestible device according to claim 1, wherein the first and second pitch angles are equal to each other.

5. The ingestible device according to claim 1, wherein the first pair of rotors is configured to generate thrust in a first direction and the second pair of rotors is configured to generate thrust in a second direction different than the first direction.

6. The ingestible device according to claim 1, wherein the second pair of rotors is larger than the first pair of rotors.

7. The ingestible device according to claim 1, wherein each of the corresponding outlet nozzles is disposed along a radial plane orthogonal to the central axis.

8. An ingestible device, comprising:
a cylindrical capsule having a central axis defined therethrough, the capsule including a proximal end portion and an atraumatically shaped distal end portion;
a propulsion unit disposed at the proximal end portion of the capsule for effecting movement of the capsule within an in vivo environment, the propulsion unit including a rotor coaxial with the central axis of the capsule; and a steering unit disposed at the proximal end portion of the capsule and configured to steer the capsule while the propulsion unit propels the capsule, the steering unit including a cam gear disposed coaxial with the central axis and having a plurality of steering paddles disposed distal to the rotor and configured to rotate about the central axis relative to the propulsion unit to control steering of the capsule.

9. The ingestible device according to claim 8, wherein the cam gear defines an aperture coaxial with the central axis and the propulsion unit is configured to be received through the aperture.

10. The ingestible device according to claim 8, wherein the plurality of steering paddles includes three steering paddles radially spaced equidistant from each other.

11. The ingestible device according to claim 8, wherein the plurality of steering paddles are disposed radially offset from the central axis.

12. The ingestible device according to claim 8, wherein the steering unit includes a steering motor coupled to the cam gear via a drive gear, the steering motor configured to drive rotation of the drive gear to, in turn, drive rotation of the cam gear for rotating the steering paddles about the central axis.

13. The ingestible device according to claim 12, wherein the steering motor extends distally from the cam gear.

14. The ingestible device according to claim 8, further comprising a protective cage disposed at the proximal end portion of the capsule and configured to house the propulsion unit and the steering unit.

15. The ingestible device according to claim 14, wherein the protective cage has a cross-type configuration.

16. The ingestible device according to claim 8, wherein the propulsion unit includes a drive motor configured to supply motive power to the rotor.

17. An ingestible device, comprising:

a cylindrical capsule having a central axis defined therethrough, the capsule including a proximal end portion and an atraumatically shaped distal end portion;

a propulsion unit disposed at the proximal end portion of the capsule for effecting movement of the capsule within an in vivo environment, the propulsion unit including a rotor coaxial with the central axis of the capsule; and a steering unit disposed at the proximal end portion of the capsule and configured to steer the capsule while the propulsion unit propels the capsule, the steering unit including three steering paddles disposed distal to the rotor and radially spaced equidistant from each other, each of the three steering paddles configured to rotate about the central axis relative to the propulsion unit to control steering of the capsule.

\* \* \* \* \*